Patented Jan. 25, 1949

2,460,103

UNITED STATES PATENT OFFICE 2,460,103

MOISTURE-RESISTANT LACQUER FOR THE PROTECTION OF ELECTRICAL COMPONENTS

Charles Rossall Pye, London, England, assignor to The Hartford National Bank & Trust Company, Hartford, Conn., as trustee No Drawing. Application March 20, 1945, Serial No. 583,854. In Great Britain August 30, 1943

Section 1, Public Law 690, August 8, 1946
Patent expires August 30, 1963

4 Claims. (Cl. 260—25)

This invention relates to a lacquer, and to the method of manufacturing it, suitable for the protection of electrical components, more especially resistors, against the influence of variations of humidity and extremes of temperature such as occurs in electrical apparatus which may be used in widely differing climates.

One field in which the lacquer of this invention finds particular utility is that of protecting resistors or other electrical components against the above-mentioned influences. To provide such protection, the resistor or component is covered directly by an electrically insulating lacquer coating, and the lacquer of this invention is then applied over such underlying or base coating. The whole may then be further coated with one or more colored lacquers for decorative or coding purposes.

While on the one hand the underlying coating of electrically insulating lacquer may conform to one of the well-known types, such as for example a solution of a phenol, cresol, or urea-formaldehyde resin in a solvent such as methylated spirits, applied by dipping or spraying followed by air drying and a curing process (e. g. heating for 1 hour at 150° C.) on the other hand the special atmospheric resistant overlying coating must consist of the lacquer according to the invention which contains an intimate chemical combination of shellac, a 100% phenolformaldehyde resin, preferably of the xylenol-formaldehyde type, and an esterified oleo-resin such as a resin consisting of the glycerides of pimaryl ricinoleic acid dissolved in an appropriate solvent or solvents such as solvent naphtha. The lacquer may be applied by spraying or dipping, followed by stoving, at say, 130° C., for 6 hours.

The process of manufacturing the lacquer of the invention in order that intimate chemical combination of the basic raw materials is obtained, is so regulated that the interaction of the phenol-aldehyde resin and the esterified oleo-resin is taken to completion, and this intercondensation product is then further reacted with the shellac until the product is completely homogeneous and the reaction is complete. This reaction product is then diluted to the requisite viscosity with a suitable solvent.

Whilst the properties of the three resins used in the overlying lacquer are known individually, the resistance to climatic variations of the blended mixture described above surpasses that of any of the three resins used individually and could not be anticipated from the known properties of the individual resins referred to.

The phenol-aldehyde resin and the shellac should be employed in the proportion of approximately 5 to 3 by weight but the proportion of the esterified oleo-resin may be varied between about 220% and 140% of the weight of the phenol-aldehyde resin.

The following examples illustrate the invention:

1. A resistor to be protected as described above is dipped in a solution of 1 kgm. of xylenol-formaldehyde, in 1 litre of methylated spirits. After drying in the air, the resistor is heated in an oven to 150° C. for 1 hr. After cooling, the resistor is dipped in a lacquer comprising 4 kgms. of glycerides of pimaryl ricinoleic acid, 2.5 kgms. of 1.3.5. xylenol-formaldehyde resin, and 1.5 kgms. of dewaxed blonde shellac, dissolved in 9 litres of solvent naptha. In preparing the lacquer, the resins are first melted together carefully and then, after cooling, dissolved in the solvent naphtha by stirring.

After air drying, the resistor is again stoved, for 6 hours at 130° C. After cooling the resistor may be further coated with colour coding or decorative lacquers in any well known manner, this latter operation not being essential to the protective process as such.

2. A resistor to be protected as described above is dipped in a solution of 1 kgm. of xylenol-formaldehyde in 1 litre of methylated spirit. After drying in the air the resistor is heated in an oven to 150° C. for one hour. After cooling the resistor is dipped in a lacquer comprising 5.5 kgms. of glyceride of pimaryl ricinoleic acid, 2.5 kgms. of 1.3.5. xylenol-formaldehyde resin, and 1.5 kgms. of dewaxed blonde shellac, dissolved in 10 litres of solvent naphtha. In preparing the lacquer, the resins are first melted together carefully and then, after cooling, dissolved in the solvent naphtha by stirring.

After air drying, the resistor is again stoved for 6 hours at 130° C. After cooling the resistor may be further coated with colour coding or decorative lacquers in any well known manner, this latter operation not being essential to the protective process as such.

3. A resistor to be protected as described above is dipped in a solution of 1 kgm. of xylenol-formaldehyde resin in 1 litre of methylated spirit. After drying in the air the resistor is heated in an oven to 150° C. for one hour. After cooling the resistor is dipped in a lacquer comprising 3.5 kgms. of glycerides of pimaryl ricinoleic acid, 2.5 kgms. of the 1.3.5. xylenol-formaldehyde resin, and 1.5 kgms. of dewaxed blonde shellac, dissolved in 8.5 litres of solvent naphtha. In preparing the lacquer, the resins are first melted together carefully and then, after cooling, dissolved in the solvent naphtha by stirring.

After air drying, the resistor is again stoved for 6 hours at 130° C. After cooling the resistor may be further coated with colour coding or decorative lacquers in any well known manner, this latter operation not being essential to the protective process as such.

Lacquers prepared according to the present invention are not only applicable to the protection of resistors but also suitable for use on ceramic condensers or other components with a non-porous surface.

I claim:

1. A lacquer to protect electrical components comprising an intimate chemical combination of approximately 5 parts by weight of shellac, approximately 3 parts by weight of xylenol-formaldehyde resin, a glyceride of pimaryl ricinoleic acid in the proportion of approximately between 140% and 220% by weight of said xylenol-formaldehyde resin, and a lacquer solvent.

2. A process for the manufacture of a protectice lacquer for electrical components, comprising the steps of mixing xylenol-formaldehyde resin and glycerides of pimaryl ricinoleic acid in the proportion of approximately between 140% and 220% by weight of the xylenol formaldehyde resin, reacting said resin mixture to form a completely reacted resin product, adding shellac in the proportion of approximately 5 parts by weight of shellac to three parts by weight of the xylenol-formaldehyde to said reacted resin product to obtain a homogeneous and completely reacted lacquer, and diluting said reacted mixture to the required viscosity with solvent naptha.

3. A lacquer to protect electrical components comprising an intimate chemical combination of approximately 5 parts by weight of shellac, approximately 3 parts by weight of 1-3-5 xylenol-formaldehyde resin, a glyceride of pimaryl ricinoleic acid in the proportion of approximately between 140% and 220% by weight of the xylenol-formaldehyde, and a lacquer solvent.

4. A lacquer to protect electrical components comprising an intimate chemical combination of approximately 5 parts by weight of blonde dewaxed shellac, approximately 3 parts by weight of xylenol-formaldehyde resin, a glyceride of pimaryl ricinoleic acid in the proportion of approximately between 140% and 220% by weight of the xylenol-formaldehyde, and solvent naptha.

CHARLES ROSSALL PYE.

REFERENCES CITED

The following references are of record in the file of this patent:

UNITED STATES PATENTS

| Number | Name | Date |
| --- | --- | --- |
| 1,197,601 | Buffum | Sept. 12, 1916 |
| 2,079,926 | Rosenblum | May 11, 1937 |
| 2,321,629 | Rosenblum | June 15, 1943 |